July 12, 1955   H. K. FARR   2,713,151
TWO CHANNEL ROTARY JOINT
Filed March 29, 1946

INVENTOR
HAROLD K. FARR
BY  M. A. Hayes

ATTORNEY

United States Patent Office 2,713,151
Patented July 12, 1955

2,713,151

TWO CHANNEL ROTARY JOINT

Harold K. Farr, Binghamton, N. Y., assignor, by mesne assignments, to the United States of America as represented by the Secretary of the Navy Application March 29, 1946, Serial No. 657,994

3 Claims. (Cl. 333—6)

This invention relates to a rotating waveguide joint and more particularly to such a joint through which two waves can be passed without interference.

There are many applications in which it is necessary to feed two antennae on the same rotating platform. Since there can be only one axis of rotation of such a platform, it is physically impossible to use a separate rotating joint for each antenna. Heretofore it has been necessary to locate the transmitters on the platform with the antennae to alleviate this difficulty. However this arrangement presents numerous maintenance difficulties which it is desirable to avoid.

Therefore, it is an object of this invention to provide a means for passing two waves through a rotating waveguide joint.

It is a further object of this invention to provide a means for separating the aforementioned waves after they have passed through the rotating joint.

These and other objects will become apparent upon consideration of the following description in conjunction with the accompanying drawing in which.

Figure 1:
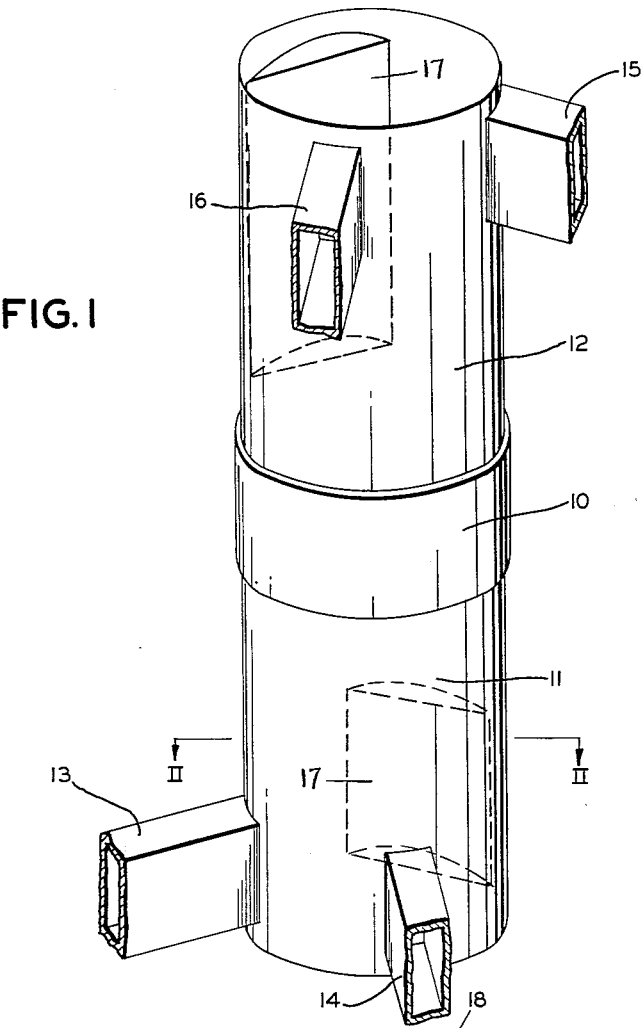
Fig. 1 is a perspective view of an embodiment of this invention.

Fig. 1 discloses a rotating cylindrical collar 10 joining two identical circular waveguide sections 11 and 12 so that their axes are coincident. The free ends of each of circular waveguide sections 11 and 12 are fed by two rectangular waveguides having their axes perpendicular to one another and to the axes of the circular waveguide sections 11 and 12 and their wide dimensions parallel to the axes of the circular waveguides. Rectangular waveguides 13 and 14 feed circular waveguide section 11 and rectangular waveguides 15 and 16 feed circular waveguide section 12.

Figure 2:
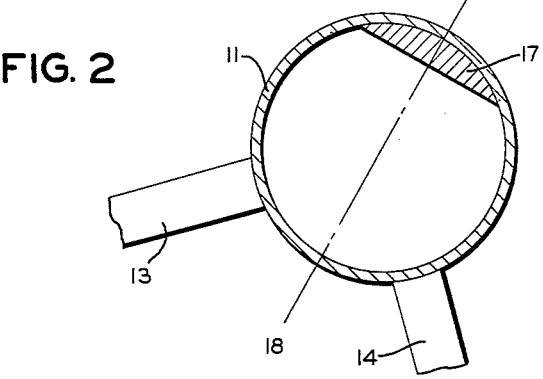
Fig. 2 is a sectional view of one of the circular waveguide sections shown on Fig. 1 taken perpendicular to its axis along section II—II.

Fig. 2 is a sectional view of circular waveguide section 11 taken perpendicular to its axis and looking toward rectangular waveguides 13 and 14. A sectional view of circular waveguide section 12 would be identical with rectangular waveguides 15 and 16 replacing 13 and 14 respectively. Quarter wave plate 17 is a metallic slab inserted in circular waveguide section 11 with its axis of symmetry 18 at 45 degrees to the axes of mutually perpendicular rectangular waveguides 13 and 14. Its dimensions are such that a wave travelling past it in circular waveguide section 11 with its electric field vector parallel to the axis of symmetry 18 will be retarded in time phase by exactly 90 degrees with respect to a wave whose electric field vector is perpendicular to the axis of symmetry 18. An identical quarter wave plate is similarly positioned in circular waveguide section 12.

In operation a wave may be transmitted between rectangular waveguides 13 and 15 or vice versa. None of the energy of this wave will appear in rectangular waveguides 14 or 16. At the same time a second wave may be transmitted in either direction between rectangular waveguides 14 and 16 with none of its energy appearing in rectangular waveguides 13 or 15.

Briefly, circular waveguide section 11 transforms an input wave from either rectangular waveguide 13 or 14 into a circularly polarized wave for transmission through the rotating joint and circular waveguide section 12 reconverts this circularly polarized wave into a suitable wave for transmission through rectangular waveguide 15 or 16. Circular waveguide section 11 transforms a wave from rectangular waveguide 13 into a wave with counter-clockwise circular polarization, for example, while it transforms a wave from rectangular waveguide 14 into a wave with clockwise circular polarization. Since circular waveguide sections 11 and 12 are identical, the counter-clockwise wave from rectangular waveguide 13 is transformed into a wave for rectangular waveguide 15 while the clockwise wave from rectangular waveguide 14 is transformed into a wave for rectangular waveguide 16.

In the following discussion it is to be understood that the dimensions of the waveguides are so chosen that the rectangular waveguides will support radiation only in the $TE_{01}$ mode and the circular waveguides will support radiation only in the $TE_{11}$ mode. This can be done since these are the dominant modes for these waveguides and therefore have longer cut off wave lengths than any other modes which may be excited in waveguides of these types. In the $TE_{01}$ mode of the rectangular waveguide, all components of the electric field lie in a plane transverse to the direction of propagation and there are no half period variations in the density of the electric field across the narrower dimension, but one across the wider dimension of the guide. In the $TE_{11}$ mode of the circular waveguide, all components of the electric field lie in a plane transverse to the direction of propagation and there is one full period variation of the radial component of the electric field density along the angular direction and one half period variation of the angular component along the radial direction.

Referring to Fig. 2 a wave incident in rectangular waveguide 13 will excite a wave in circular waveguide section 11 whose electric field vector lies perpendicular to the axis of rectangular waveguide 13. This latter wave can be thought of as being made up of two components whose electric field vectors are, respectively, parallel to and perpendicular to the axis of symmetry 18 of quarter wave plate 17. The former component will be retarded 90 degrees in time phase in passing along the length of the quarter wave plate 17 and the resultant wave will be made up of two components whose electric field vectors are equal in magnitude but 90 degrees out of time phase. The resultant of two such components is a wave whose electric field vector rotates as the wave progresses. This wave passes through the rotating cylindrical collar and on into circular waveguide section 12. Here again it can be thought of as being made up of two components whose electric field vectors are, respectively, parallel to and perpendicular to the axis of symmetry of the quarter wave plate in circular waveguide section 12. The former component which had previously been retarded 90 degrees is again retarded by 90 more degrees and the resultant is a wave no longer circularly polarized but so polarized that it will be propagated in rectangular waveguide 15. A similar analysis for a wave incident in rectangular waveguide 14 shows that the circular polarization is of the opposite sense and the final resultant wave is so polarized that it will be propagated in rectangular waveguide 16.

This invention is to be limited in no way to the embodiment described herein but only by the appended claims.

What is claimed is:

1. A rotating circular waveguide joint comprising a cylindrical collar, two circular waveguide sections joined by said collar and having a common axis, each of the free ends of said circular waveguide sections being joined to two mutually perpendicular rectangular waveguides, said rectangular waveguides having their axes perpendicular to the axes of said circular waveguide sections and their wide dimensions parallel thereto, and two conductive plates identically positioned in said two circular waveguide sections between said cylindrical collar and said rectangular waveguides, a planar surface of said conductive plates being at 45 degrees with respect to the axes of said rectangular waveguides.

2. A rotating circular waveguide joint comprising, a cylindrical collar, two circular waveguide sections joined by said collar and having a common axis, two pairs of transmission lines, each of the free ends of said circular waveguide sections being connected to one of said pairs of transmission lines, the points of junction of each of said transmission lines of each of said pairs with their respective circular sections being separated by 90° about the circumference of said circular sections, and a conductive plate identically positioned in each of said circular waveguide sections between said cylindrical collar and said transmission lines, the axis of symmetry of said conductive plates being at 45° to the axes of transmission lines connected to respective circular sections.

3. A rotating circular wave guide joint comprising, in combination, a cylindrical collar, two circular wave guide sections joined by said collar and having a common axis, two pairs of rectangular wave guides, each pair of said wave guides being connected to one of said circular wave guide sections adjacent the free ends of said sections, the points of junction of said rectangular wave guides of each of said pairs with their respective circular sections being separated by 90° about the circumference of said circular sections, a conductive member having the shape of a circular segment forming a lining for a portion of the inner surface of each circular wave guide section, each conductive member being disposed between said collar and a pair of rectangular wave guides with its planar surface at a 45° angle to the longitudinal axes of the adjacent pair of rectangular wave guides, said conductive member having a length and a thickness such that linearly polarized electromagnetic energy fed into said circular wave guide sections via said rectangular wave guides is transformed by said conductive member into circularly polarized waves prior to its propagation through said collar.

References Cited in the file of this patent
UNITED STATES PATENTS

| | | |
|---|---|---|
| 2,337,184 | Carter | Dec. 21, 1943 |
| 2,458,579 | Feldman | Jan. 11, 1949 |
| 2,607,849 | Purcell et al. | Aug. 19, 1952 |